United States Patent [19]

Köhler et al.

[11] Patent Number: 4,968,761

[45] Date of Patent: Nov. 6, 1990

[54] PROCESS OF FUSING POLYARYLENE SULFIDE WITH SULFONIC ACID SALT

[75] Inventors: Burkhard Köhler; Rolf-Volker Meyer; Hans-Detlef Heinz; Hans-Joachim Traenckner, all of Krefeld, Fed. Rep. of Germany

[73] Assignee: Bayer Aktiengesellschaft, Leverkusen, Fed. Rep. of Germany

[21] Appl. No.: 336,827

[22] Filed: Apr. 12, 1989

[30] Foreign Application Priority Data

Apr. 27, 1988 [DE] Fed. Rep. of Germany ....... 3814165

[51] Int. Cl.$^5$ .............................................. C08G 75/14
[52] U.S. Cl. ...................................... 525/537; 528/388
[58] Field of Search .......................... 525/537; 528/388

[56] References Cited

U.S. PATENT DOCUMENTS 3,839,301 10/1974 Scoggins ............................. 525/537
4,645,826 2/1987 Iizuka et al. ........................ 525/537
4,663,431 5/1987 Fujii ................................... 528/388

FOREIGN PATENT DOCUMENTS 0103279 3/1984 European Pat. Off. .

Primary Examiner—Harold D. Anderson
Attorney, Agent, or Firm—Connolly and Hutz

[57] ABSTRACT

The invention relates to high-molecular polyarylene sulphides (PAS) and a process for producing them.

1 Claim, No Drawings

PROCESS OF FUSING POLYARYLENE SULFIDE WITH SULFONIC ACID SALT

The invention relates to high-molecular polyarylene sulphides (PAS) and a process for producing them.

Polyarylene sulphides are inert thermoplasts, which are resistant to high temperatures and which also allow a high filler content with glass fibres and/or other organic fillers. These polymers, particularly polyparaphenylene sulphide (PPS) are now increasingly used mainly in the fields which were previously reserved for thermoset materials.

However PPS is not always satisfactorily tough; it can become tougher when the melt viscosity is higher. A rapid crystallisation of PAS can be undesirable in some applications, e.g. when producing films. Types of PPS having a high melt viscosity do not tend to crystallise so rapidly.

Methods for producing branched polyarylene sulphides having a higher molecular weight are known, e.g. curing using air, sulphur (e.g. U.S. Pat. Nos. 3,524,835, 3,793,256, EP-OS Nos. 53 585, 64 300, 91 088, U.S. Pat. No. 3,699,087).

Using a gaseous curing agent is disadvantageous in that it is difficult to dose out the gas. It is not possible to carry out a secondary cross-linking process on the finished moulded part.

If sulphur is used in an additional treatment, it can evaporate as hydrogen sulphide for example (e.g. Polym. Degradation and Stability 11, 55 (1985).

These disadvantages can be avoided by using disulphonic acid as an additional method for increasing the melt viscosity of PAS e.g. (U.S. Pat. No. 3,839,301). However, adding acids can make the melt viscosity increase at an uncontrollable rate during the additional treatment.

It has now been found, that special selected salts of polysulphonic acids increase the melt viscosity at a controlled rate when incorporating it into the PAS melt.

Object of the invention is therefore to obtain high-molecular polyarylene sulphides, preferably polyphenylene sulphides, by melting down known polyarylene sulphides of Formula I,

   (I)

whereby,
Ar represents a $C_6$- to $C_{24}$-arylene, residue of para- and/or meta- phenylene, naphthalene or 4,4'-biphenylene residues, preferably para-phenylene residue, and n represents an arbitrary natural number, preferably between 10 and 5,000, using salts of polyfunctional, preferably difunctinal sulphonic acids of Formula(e) II and/or III

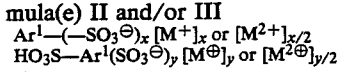

whereby
$Ar^1$ represents $C_6$-$C_{24}$-arylene, preferably meta-phenylene, biphenylene such as 4,4'-biphenylene, a di-, tri- or tetravalent naphthalene residue, a di-, tri- or tetravalent pyrene residue, M represents a uni- or bivalent metal cation, preferably an ammonium ion, sodium ion, potassium ion, magnesium ion or calcium ion, x represents an integer greater than 1, preferably 2,3,4 and y represents an integer greater than zero, preferably 1,2 or 3.

Polyarylene sulphides and the production thereof are known and customary in the trade (e.g. U.S. Pat. No. 3,354,129, EP-OS No. 171 021).

Examples of sulphonic acid salts according to the invention are mono- and di- sodium or potassium salts from m-phenylene sulphonic acid, 1,6-naphthaline disulphonic acid, 1,4-naphthaline disulphonic acid, 2,6-naphthaline disulphonic acid, 2,7-naphthaline disulphonic acid, 1,5-naphthaline disulphonic acid, 1,1'-biphenyl-4,4'-disulphonic acid, 6-formyl-1,3-benzoyl-disulphonic acid and 9H-carbazole-2,7-disulphonic acid, the di- or tri- sodium or potassium salts of 1,3,5-naphthaline trisulphonic acid, or the tri-or tetra- sodium or potassium salts of 1,3,5,7-naphthaline tetrasulphonic acid and 1,3,6,8-pyrene tetrasulphonic acid. They can be applied individually or as a mixture.

Object of the invention is also a process for producing the polyarylene sulphides according to the invention, characterised in that the mixture of polyarylene sulphide of Formula I having 3-30%-by-wt, preferably 5-20%-by-wt, and the sulphonic acid salts of Formulas II and/or III are fused.

The additional treatment in the melt lasts for 0.5 to 500 mins, preferably 10 to 100 mins.

The temperature for the additional treatment in the melt according to the invention is 280° C. to 450° C., preferably 300° C. to 360° C.

In a particular embodiment, moulded pieces in solid phase from the polyarylene sulphides obtained according to the invention, can be additionally treated with heat at temperatures of 150° C. to 270° C.

The process according to the invention can be carried out under inert gases (e.g. nitrogen or argon), if necessary in a vacuum up to $10^{-5}$ bar, or in the air, e.g. in standard extruders or kneaders.

The polyarylene sulphides according to the invention can be worked into moulded pieces (e.g. films) by e.g. injection moulding or extrusion. They are particularly suitable for the production of fibres.

The polyarylene sulphides according to the invention can be admixed with standard fillers, e.g. quartz, talc, glass fibres, metal (salts), metal oxides, pigments etc.

EXAMPLE 1

100 g polyparaphenylene sulphide having a melt viscosity of 44 Pa.s (at 306° C. and $1000s^{-1}$) are mixed with 10 g 6-formyl-1,3-benzoyl disulphonic acid, monosodium salt, and stirred under nitrogen for 60 min at 320° C. The melt viscosity of the resultant polyarylene sulphide is 320 Pa.s.

EXAMPLE 2

Example 2 proceeds as described in Example 1. 10 g 1,6-naphthalene disulphonic acid, monosodium salt are used as the sulphonic acid salt. The melt viscosity of the resultant polyarylene sulphide is 250 Pa.s.

EXAMPLE 3

Example 3 proceeds as described in Example 1. 20 g 1,6-naphthalene disulphonic acid, monosodium salt are used as the sulphonic acid salt. The melt viscosity of the resultant polyarylene sulphide is 13 000 Pa.s.

EXAMPLE 4

Example 4 proceeds as described in Example 1. 20 g 1,4-naphthaline disulphonic acid, disodium salt are used as the sulphonic acid salt. The melt viscosity of the resultant polyarylene sulphide is 70 Pa.s.

EXAMPLE 5

100 g polyparaphenylene sulphide having melt viscosity 5 Pa.s are mixed with 10 g 6-formyl-1,3-benzoyl disulphonic acid, monosodium salt, and are stirred under nitrogen for 60 mins at 320° C. The melt viscosity of the resultant polyarylene sulphide is 43 Pa.s.

What is claimed is:

1. Process for preparing a polyarylene sulphide product which comprises fusing 97–70% by weight of polyarylene sulphide comprising repeating units of the following formula (I):

$$[-Ar-S-]_n \quad (I)$$

wherein Ar is $C_6$ to $C_{24}$ arylene, phenylene, naphthylene, or 4,4′-biphenylene, and n is an integer, with 3 to 30% by weight of acid salt of the following formula (II) or (III) or both:

$$Ar^1-(-SO_3-^\ominus)_x [M^\oplus]_x \text{ or } [M^{2\oplus}]_{x/2} \quad (II)$$

$$HO_3S-Ar^1-(SO_3^\ominus)_y [M^\oplus]_y \text{ or } [M^{2\oplus}]_{y/2} \quad (III)$$

wherein Ar is $C_6$ to $C_{24}$ arylene, biphenylene, bivalent naphthalene, trivalent naphthalene, tetravalent naphthalene, bivalent pyrene, trivalent pyrene or tetravalent pyrene, m is a monovalent or bivalent metal cation, x is an integer greater than 1, and y is an integer greater than zero.

* * * * *